United States Patent
Stokes et al.

(10) Patent No.: US 7,590,584 B1
(45) Date of Patent: Sep. 15, 2009

(54) COMPUTER SYSTEM FOR VIRTUAL SHARE DEALING

(75) Inventors: Christopher John Stokes, Bracknell (GB); Roy James Bunyan, Hook (GB); Graham Tull, Slough (GB)

(73) Assignee: Fujitsu Services Limited, London (GB)

( * ) Notice: Subject to any disclaimer, the term of this patent is extended or adjusted under 35 U.S.C. 154(b) by 0 days.

(21) Appl. No.: 09/563,731

(22) Filed: May 3, 2000

(30) Foreign Application Priority Data

Jul. 23, 1999 (GB) ................................. 9917174.6

(51) Int. Cl.
*G06Q 40/00* (2006.01)

(52) U.S. Cl. .............................. 705/37; 705/38; 705/36; 705/35

(58) Field of Classification Search ............. 705/35–40, 705/34, 1, 26
See application file for complete search history.

(56) References Cited

U.S. PATENT DOCUMENTS

| | | | | |
|---|---|---|---|---|
| 4,934,707 | A * | 6/1990 | Koster ......................... | 273/240 |
| 5,812,988 | A * | 9/1998 | Sandretto .................... | 702/179 |
| 6,078,904 | A * | 6/2000 | Rebane ....................... | 705/35 |
| 6,088,685 | A * | 7/2000 | Kiron et al. ................. | 705/35 |
| 6,173,276 | B1 * | 1/2001 | Kant et al. ................... | 706/50 |
| 6,188,993 | B1 * | 2/2001 | Eng et al. .................... | 705/37 |
| 6,236,972 | B1 * | 5/2001 | Shkedy .......................... | 705/1 |
| 6,505,174 | B1 * | 1/2003 | Keiser et al. .................. | 705/37 |
| 6,513,020 | B1 * | 1/2003 | Weiss et al. ................... | 705/36 |
| 2002/0059127 | A1 * | 5/2002 | Brown et al. ................. | 705/36 |
| 2004/0186803 | A1 * | 9/2004 | Weber et al. ................. | 705/35 |

FOREIGN PATENT DOCUMENTS

| | | |
|---|---|---|
| GB | 2 277 177 | 10/1994 |
| WO | WO 95/27945 | 10/1995 |
| WO | WO 97/39415 | 10/1997 |

OTHER PUBLICATIONS

'Somewhere' in Canada, Microsoft buys a startup; [National Edition] John Greenwood. National Post. Don Mills, Ont.: Jun 9, 1999. p. C.01.*

* cited by examiner

*Primary Examiner*—Frantzy Poinvil
*Assistant Examiner*—Clement Graham
(74) *Attorney, Agent, or Firm*—Barnes & Thornburg LLP

(57) ABSTRACT

A computer system buys and sells virtual shares on behalf of investors, usually investing small sums, in order to reduce the dealing costs for small transactions. The system thus maintains a notional level of shares held on behalf of all the investors who participate in the system. A monitoring process runs continually checking exposure on individual shares, and the system buys and sells blocks of real shares in the market to keep the exposure to individual companies at an acceptable level. By buying and selling larger blocks of real shares on a more infrequent basis than the virtual share transactions, the smaller transactions are effectively consolidated together, with associated cost savings.

12 Claims, 2 Drawing Sheets

COMPUTER SYSTEM FOR VIRTUAL SHARE DEALING

BACKGROUND TO THE INVENTION

This invention relates to a computer system providing a virtual share dealing service for investors.

In recent years there has been a significant rise in the ownership of shares by the general public, together with a desire to invest on a regular basis in the equities market. However, the dealing costs, both commission and the bid-to-offer spread, associated with share transactions means that it is difficult for a small investor to contribute to a regular equities based savings plan except by purchasing units in a unit trust scheme or similar.

The object of the present invention is to provide a way of overcoming this problem.

SUMMARY OF THE INVENTION

According to the invention, there is provided a computer system for allowing a plurality of users to buy and sell virtual shares in a plurality of companies. The system comprises:

(a) means for storing a record of the number of virtual shares held by each user in each company;

(b) means for storing a record of the number of shares actually held by the system in each company;

(c) means for allowing the users to buy and sell virtual shares, and for updating the record of the number of virtual shares held by each user;

(d) means for determining a risk position on the shares in each company, based on the total number of virtual shares held in that company relative to the number of shares actually held in that company; and (e) means for automatically buying or selling shares to reduce the risk position on those shares, and for updating the record of the number of shares actually held by the system in each company.

It can be seen that the system reduces dealing costs on share purchases and sales for investors, by maintaining a virtual portfolio of shares for each user and allowing users to buy and sell shares as "book entries" rather than actual transactions on the stock market. The corresponding actual transactions may be made by the system on a less frequent basis, allowing a number of virtual transactions to be consolidated into a larger actual transaction. The system thus provides a service for investors wishing to buy and sell shares, typically involving relatively small sums of money in any particular company.

DESCRIPTION OF AN EMBODIMENT OF THE INVENTION

One embodiment of the invention will now be described by way of example with reference to the accompanying drawings.

Figure 1:
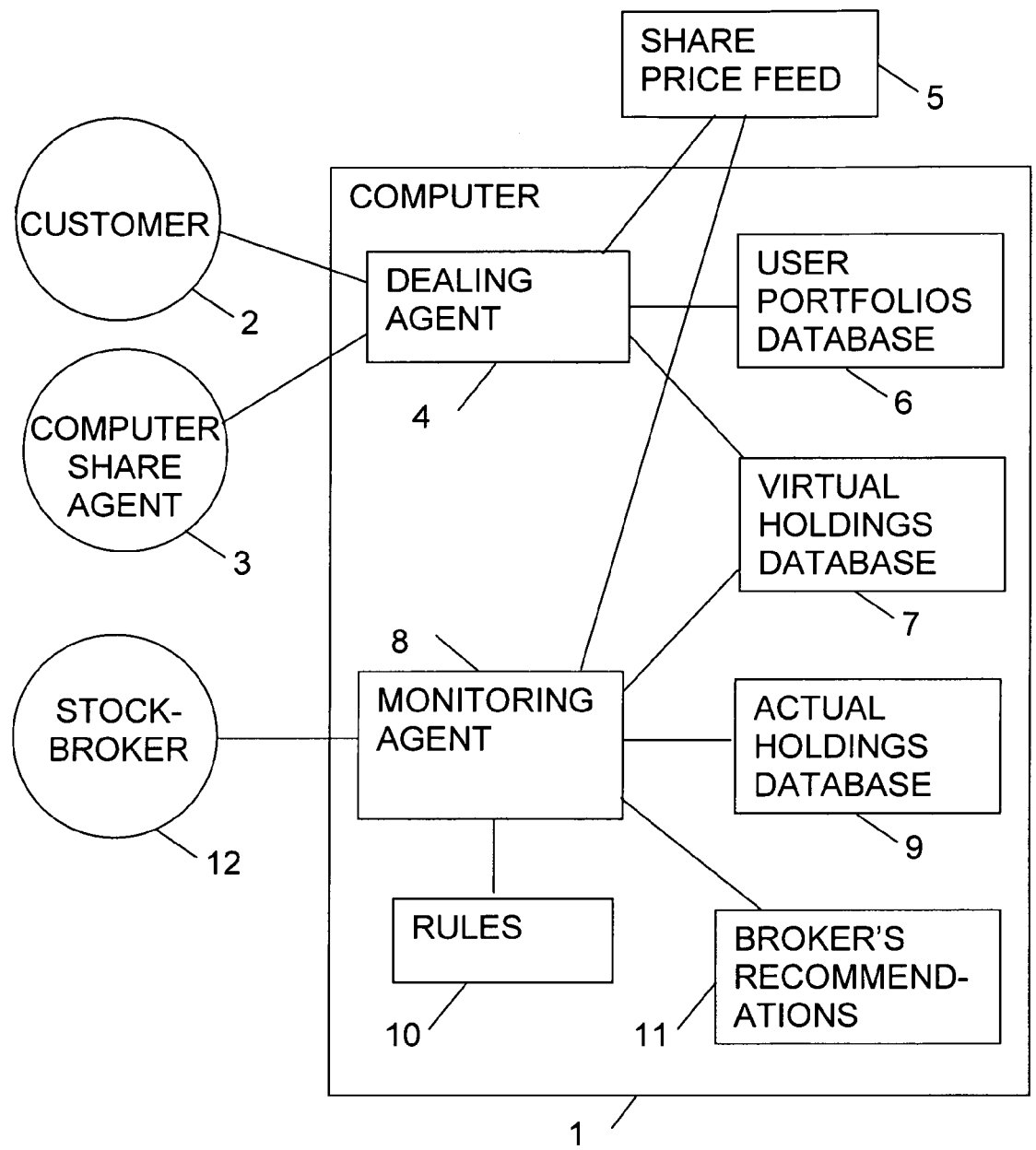
FIG. 1 is a block diagram of a computer system embodying the invention.

FIG. 1 shows a computer system 1, which provides a service to a number of users 2, 3 for buying and selling shares in a predefined limited set of companies (e.g. the leading 100 companies on the London Stock Market). As shown, the users include personal customers 2 and also computer share agents 3 acting on behalf of personal customers. The users may communicate with the system by the Internet, electronic mail, or by any other convenient means.

The operator of the system (which may typically be a stockbroker, bank or other financial institution) holds a pool of shares in the limited set of companies, on behalf of the users. The system maintains a database 9 containing a record of the number of shares actually held in each company (referred to herein as the "actual holdings").

The system also maintains a database 6 containing a record of the number of virtual shares held by each user 2, 3 in each company (referred to herein as the "user portfolios").

The system also maintains a database 7 containing a record of the total number of virtual shares held in each company (referred to herein as the "virtual holdings"). The virtual holding in each company is therefore the sum of the number of virtual shares in that company across all of the user portfolios. For any company, the virtual holding may be higher than, lower than or the same as the actual holding. Any difference between these figures represents the risk position the system is taking on the particular shares.

The computer system also includes a dealing agent 4, which receives and services transaction requests from the users. Each transaction request specifies the user's identity, whether shares are to be bought or sold, the company, and the number of shares to be traded.

When the dealing agent receives a transaction request from a user to buy shares in a particular company, it adds the specified number of virtual shares in the company to the user's portfolio in the database 6, and debits the user's bank account for the cost of the purchase. It also increases the virtual holding of shares in the company recorded in the database 7 by the same amount.

Similarly, when the dealing agent receives a transaction request from a user to sell shares in a particular company, it subtracts the specified number of virtual shares in the company from the user's portfolio in the database 6, and credits the user's bank account with the proceeds of the sale. It also decreases the virtual holding of shares in the company recorded in the database 7 by the same amount.

All purchases and sales take place at the prevailing market rates, supplied by a share price feed 5.

Since the purchases and sales do not take place on the stock market, but are rather "book entries" on the system, the cost of processing these transactions will be minimal, and hence cost savings can be passed on to the user through reduced dealing charges.

Figure 2:
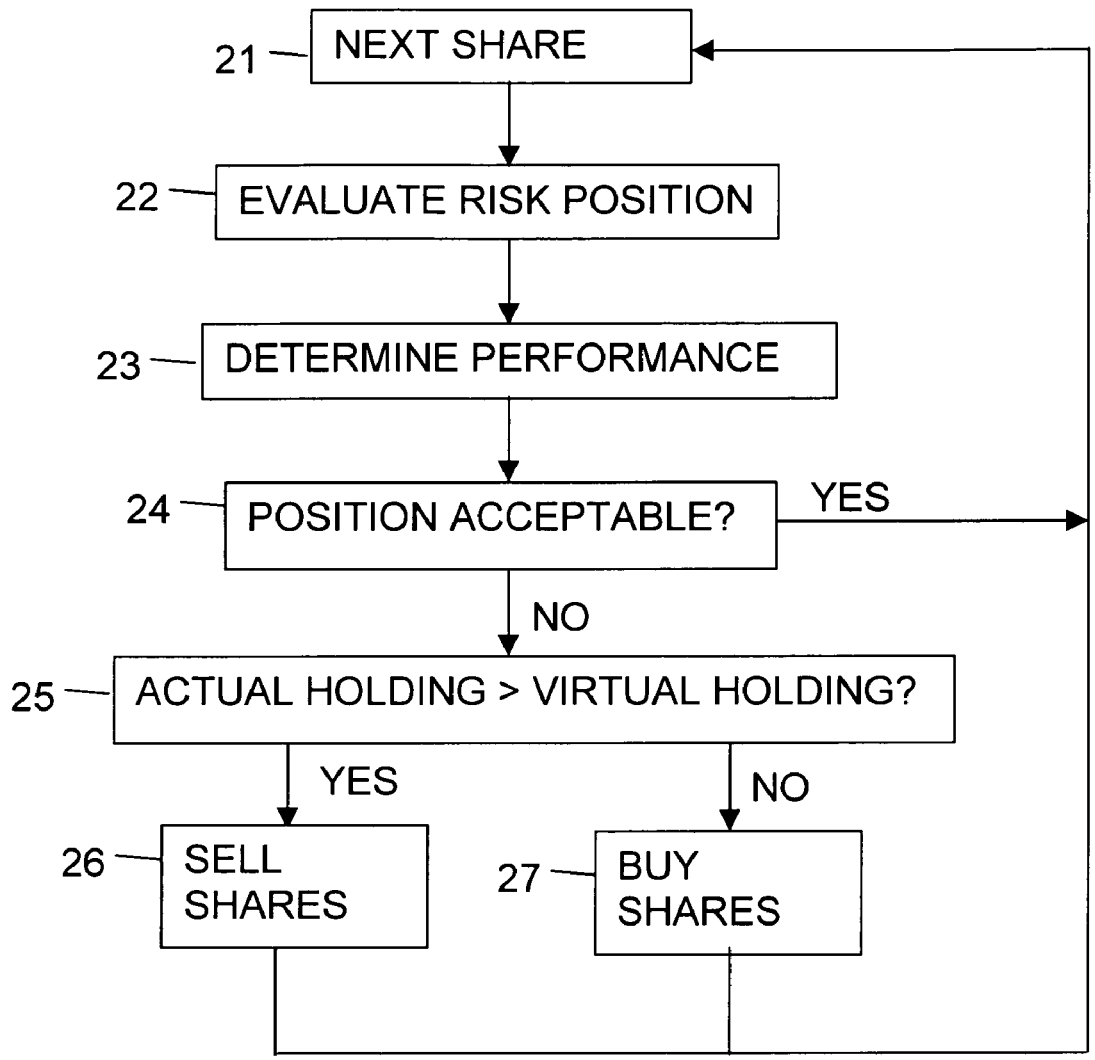
FIG. 2 is a flow chart illustrating the operation of the system.

Whenever the actual holding and virtual holding for a company differ, a risk position exists for the operator of the system. In order to ameliorate this risk, a monitoring process 8 is run, continuously checking the risk positions of each of the shares in turn. This monitoring process will now be described with reference to FIG. 2.

(Step 21) The monitoring process selects the next share to be considered.

(Step 22) The process evaluates the size of the risk position for the selected share, by finding the difference between the actual holding as recorded in the database 9 and the virtual holding as recorded in the database 7, and multiplying this difference by the current share price.

(Step 23) The process also determines the recent performance of the share from changes in the share price over various time periods, e.g. the last month, the last week, during the current day and over the past hour. It also obtains a current "in house" broker's recommendation 11 on the share from the operator of the system.

(Step 24) The process then evaluates these factors against a set of rules 10 to determine whether the position on this share is acceptable. If the position is acceptable, the process returns to step 21, and the loop is repeated for the next share.

(Step 25) If the position on the share is not acceptable, further action depends on whether the actual holding is greater than or less than the virtual holding.

(Step 26) If the actual holding is greater than the virtual holding, the monitoring process automatically sells a block of shares in the market to reduce the actual holding. When the shares are sold, the actual holding recorded in the database 9 is reduced by the appropriate number of shares. The user portfolio and virtual holding as recorded in the databases 6 and 7 are not altered by the sale. Thus the risk position on the shares is reduced.

(Step 27) If the actual holding is less than the virtual holding, the monitoring process automatically buys a block of shares in the market to increase the actual holding. When the shares are bought, the actual holding recorded in the database 9 is increased by the appropriate number of shares. As before, the user portfolio and virtual holding as recorded in the databases 6 and 7 are not altered. Thus the risk position on the shares is reduced.

In this embodiment, buying and selling of actual shares takes place through a stockbroker 12, for example using electronic mail or the Internet.

It should be noted that buying and selling of shares is not done on behalf of any individual user, but only to increase or reduce the pool of shares held by the system operator. Individual users hold only virtual shares, not actual shares.

Optionally, at the end of each day, the system may perform a process which closes out all risk positions by buying or selling shares, so as to make the actual holding of each share equal to the virtual holding for that share. This protects the provider of the system against severe price fluctuations whilst the market is closed.

It will be appreciated that computer programs for operating the computer 1 to perform the described method may be supplied on any computer-readable storage medium such as a CDROM or magnetic disk. It will also be appreciated that many modifications may be made to the system described above without departing from the scope of the present invention as defined in the following claims.

The invention claimed is:

1. A computer system for allowing a plurality of users to buy and sell virtual shares in a plurality of companies, which virtual shares allow users to buy and sell shares as book entries rather than actual transactions on the stock market, whereby, for any company, a virtual holding may be higher than, less than or the same as a virtual holding, the system comprising:
   (a) means for storing a record of the number of virtual shares held by each user in each company;
   (b) means for storing a record of the number of real shares held by the system in each company;
   (c) means for allowing the users to buy and sell virtual shares in a company of their choice, and for updating the record of the number of virtual shares held by each user;
   (d) means for determining, for each company, the difference between the total number of virtual shares held in that company by the users, and the number of real shares held in that company by the system; and
   (e) means for automatically buying or selling real shares externally of the system to reduce said difference, and for updating the record of the number of real shares held by the system in each company.

2. A system according to claim 1, including means for determining whether said difference is acceptable and for buying and selling real shares only if said difference is not acceptable.

3. A system according to claim 1 including means for debiting or crediting the users with amounts based on the current market prices when virtual shares are bought or sold.

4. A system according to claim 1 including means for automatically buying or selling real shares at the end of each day, to reduce said difference to zero.

5. A method for allowing a plurality of users to buy and sell virtual shares in a plurality of companies, which virtual shares allow users to buy and sell shares as book entries rather than actual transactions on the stock market, whereby, for any company, a virtual holding may be higher than, less than or the same as a virtual holding, the method comprising:
   (a) holding a number of real shares in each company;
   (b) storing in a computer a record of the number of real shares held in each company;
   (c) storing in the computer a record of the number of virtual shares held by each user in each company;
   (d) operating the computer to allow the users to buy and sell virtual shares in a company of their choice, and updating the record of the number of virtual shares held by each user;
   (e) determining, for each company, the difference between the total number of virtual shares held in that company by the users, and the number of real shares held in that company by the system; and
   (f) operating the computer to automatically buy or sell real shares externally of the system to reduce said difference, and to update the record of the number of real shares held by the system in each company.

6. A method according to claim 5, including the step of determining whether said difference is acceptable and buying and selling real shares only if said difference is not acceptable.

7. A method according to claim 5 including debiting or crediting the users with amounts based on the current market prices when virtual shares are bought or sold.

8. A method according to claim 5, including automatically buying or selling real shares at the end of each day, to reduce said difference to zero.

9. A computer-readable storage medium embodying program instructions for performing a method of allowing a plurality of users to buy and sell virtual shares in a plurality of companies, which virtual shares allow users to buy and sell shares as book entries rather than actual transactions on the stock market, whereby, for any company, a virtual holding may be higher than, less than or the same as a virtual holding, the method comprising the steps:
   (a) storing in the computer a record of a number of real shares held in each of the companies;
   (b) storing in the computer a record of a number of virtual shares held by each of the users in each company;
   (c) operating the computer to allow the users to buy and sell virtual shares in a company of their choice, and updating the record of the number of virtual shares held by each user;
   (d) determining, for each company, the difference between the total number of virtual shares held in that company by the users, and the number of real shares held in that company by the system; and
   (e) operating the computer to automatically buy or sell real shares externally of the system to reduce said difference, and to update the record of the number of real shares actually held by the system in each company.

10. A computer-readable storage medium according to claim 9, wherein the method includes the step of determining whether said difference is acceptable and buying and selling real shares only if said difference is not acceptable.

11. A computer-readable storage medium according to claim 9, wherein the method includes the step of debiting or crediting the users with amounts based on the current market prices when virtual shares are bought or sold.

12. A computer-readable storage medium according to claim 9, wherein the method includes the step of automatically buying or selling real shares at the end of each day, to reduce said difference to zero.

* * * * *